US010274093B2

(12) United States Patent
Sørensen et al.

(10) Patent No.: US 10,274,093 B2
(45) Date of Patent: Apr. 30, 2019

(54) CENTRIFUGAL PUMP

(71) Applicant: GRUNDFOS HOLDING, Bjerringbro (DK)

(72) Inventors: Thomas Sørensen, Silkeborg (DK); Daniel Høpfner, Viborg (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 501 days.

(21) Appl. No.: 14/719,935

(22) Filed: May 22, 2015

(65) Prior Publication Data

US 2015/0337973 A1 Nov. 26, 2015

(30) Foreign Application Priority Data

May 23, 2014 (EP) .................................. 14169581

(51) Int. Cl.
*F16K 15/02* (2006.01)
*F04D 1/12* (2006.01)
*F04D 29/22* (2006.01)
*F04D 29/44* (2006.01)
*F04D 29/42* (2006.01)
*F04D 29/08* (2006.01)
*F04D 29/62* (2006.01)
*F04D 13/08* (2006.01)
*F04D 15/00* (2006.01)

(52) U.S. Cl.
CPC .............. *F16K 15/023* (2013.01); *F04D 1/12* (2013.01); *F04D 13/08* (2013.01); *F04D 15/0083* (2013.01); *F04D 29/086* (2013.01); *F04D 29/22* (2013.01); *F04D 29/426* (2013.01); *F04D 29/445* (2013.01); *F04D 29/628* (2013.01)

(58) Field of Classification Search
CPC ........ F16K 15/023; F16K 15/021; F04D 1/12; F04D 13/08; F04D 15/0038; F04D 29/086; F04D 29/22; F04D 29/426; F04D 29/445; F04D 29/628; Y10T 137/7913; Y10T 137/7914; Y10T 137/7837; Y10T 137/7908; Y10T 137/7909
USPC ...................................... 415/211; 137/533.19
See application file for complete search history.

(56) References Cited

U.S. PATENT DOCUMENTS

| 4,185,655 | A | * | 1/1980 | Wilkes | ..................... F16K 15/06 137/315.33 |
| 4,967,783 | A | | 11/1990 | Loos | |
| 7,096,883 | B2 | * | 8/2006 | Gessat | ..................... F16K 17/18 137/493.8 |
| 7,237,569 | B2 | * | 7/2007 | Shieh | ..................... F16K 15/04 137/533.13 |

(Continued)

FOREIGN PATENT DOCUMENTS

| DE | 36 22 130 A1 | 1/1988 | |
| GB | 2192230 A | * 1/1988 | .............. F04D 9/02 |

(Continued)

*Primary Examiner* — Woody A Lee, Jr.
(74) *Attorney, Agent, or Firm* — McGlew and Tuttle, P.C.

(57) ABSTRACT

The multi-stage submersible pump at the exit side is provided with a non-return valve (9) including a valve seat (19) and a shut-off body (15) which is movably arranged thereto in a limited manner and which is arranged with a positive fit and in a movable manner within a guide (16) surrounding the shut-off body (15) with play. The inner contour of the guide (16) tapers inwards towards the valve seat (19), counter to the main flow direction (13).

20 Claims, 8 Drawing Sheets

(56) References Cited

U.S. PATENT DOCUMENTS

| | | | |
|---|---|---|---|
| 7,506,663 B2 * | 3/2009 | Thomas ................ | F16K 15/023 |
| | | | 137/529 |
| 8,402,999 B2 * | 3/2013 | Nini ...................... | B67D 3/044 |
| | | | 137/533.19 |
| 2010/0101668 A1 * | 4/2010 | Roorda ................ | F16K 15/063 |
| | | | 137/540 |

FOREIGN PATENT DOCUMENTS

| WO | 97/05383 A1 | 2/1997 |
|---|---|---|
| WO | 2013/021387 A1 | 2/2013 |

\* cited by examiner

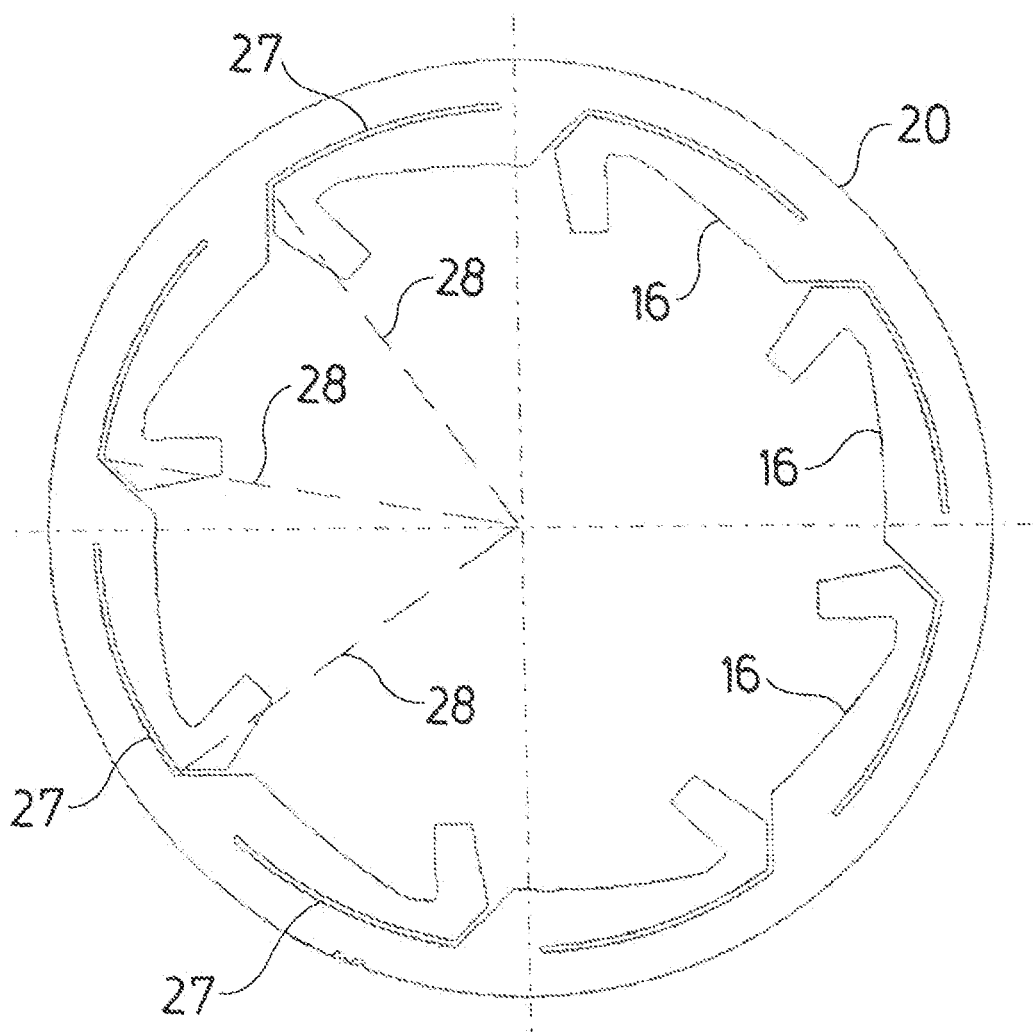

CENTRIFUGAL PUMP

CROSS REFERENCE TO RELATED APPLICATIONS

This application claims the benefit of priority under 35 U.S.C. § 119 of European Patent Application EP 14 169 581.7 filed May 23, 2014, the entire contents of which are incorporated herein by reference.

FIELD OF THE INVENTION

The invention relates to a centrifugal pump, in particular to a multi-stage submersible pump, with a non-return valve with a valve seat and with a shut-off body which is movably arranged thereto in a limited manner, wherein the shut-off body is arranged with a positive fit and in a movable manner within a guide which surrounds the shut-off body with play.

BACKGROUND OF THE INVENTION

With centrifugal pumps, it is counted as belonging to the state of the art to integrate a non-return valve within the pump, in order to prevent delivered fluid from being able to flow back through the pump. Such a non-return valve in particular is envisaged with multi-stage submersible pumps, in order to prevent a backflow through the pump, given a standstill of the pump.

The invention departs from a multi-stage submersible pump of the type Grundfos SP 30. With regard to this pump, it is the case of a well pump which in the operational position comprises a drive motor at the bottom, with a coupling arranged thereabove. The drive motor is connected via the coupling to several pump stages which are arranged thereabove and which are driven by a common shaft. A housing part connects to a last pump stage and comprises a non-return valve and just as the coupling comprises lateral recesses, into which positive fit elements engage, said elements being seated at the ends of tension/clamping straps, with which the pump stages between the end-side housing part and the coupling are clamped and mechanically connected.

The non-return valve of the end-side housing part is designed as a weld construction and is formed from sheet-metal parts. It comprises a sealing ring which is integrated into an annularly peripheral groove and which forms the contact surface for a sealing body which is likewise formed of sheet metal and is essentially plate-like. A guide in the form of guide arms and which guides the sealing body between its closure position and the releasing opened position is formed within the valve.

Although the pump is basically conceived for the uprightly standing operation, it can also be operated in a lying manner. In lying operation, the known non-return valve in particular can have problems with regard to the sealedness, if the valve plate comes to bear on the sealing seat in a non-centered manner due to gravity.

Moreover, the non-return valve can only be exchanged as a whole, since neither the seal nor the component receiving this or the valve plate can be removed from the valve housing which is designed as a closed welded construction.

SUMMARY OF THE INVENTION

Against this background, it is an object of the invention to design a centrifugal pump of the known type, in particular a multi-stage submersible pump of the previously described type, such that the previously mentioned disadvantages are avoided, in particular the pump is provided with a non-return valve which independently of the position of the pump ensures a sealed closure. Moreover, the non-return valve is to be manufactured inexpensively and should be able to be disassembled, so that it can be overhauled as the case may be.

The centrifugal pump according to the invention, in particular a multistage submersible pump comprises a non-return valve with a valve seat and with a shut-off body which is movably arranged thereto in a limited manner, wherein the shut-off body is arranged with a positive fit and in a movable manner within a guide surrounding this with play. According to the invention the inner contour of the guide is designed tapering inwards towards the valve seat counter to the main flow direction.

The basic concept of the present invention is to design the guide such that on the one hand the shut-off body can move from the closure position into the opened position with play, without there existing the danger of a canting, but on the other hand such that it is always ensured that in the closure position, shut-off body assumes a predefined, preferably centered position on the valve seat. For this, according to the invention, the guide is designed such that it is formed tapering inwards, i.e. towards the center, counter to the main flow direction which with multistage submersible pumps is always in the direction of the longitudinal axis of the pump. The design is thereby such that the shut-off body in the end phase of the movement towards the valve seat is guided by the lateral guide into its correctly envisaged position, and specifically independently of whether the pump is operated in a standing manner, lying manner or in another position. Moreover, by way of this inwardly tapering inner contour of the guide, one further succeeds in the radial play of the guide increasing directly after lifting the shut-off body from the valve seat, by which means the shut-off body can move adequately freely and can be brought into the opened position with a low friction and without the danger of a canting.

According to an advantageous further development of the invention, the inner contour of the guide is not only designed tapering inwards towards the valve seat oppositely to the main flow direction, but also likewise designed tapering inwards in the main flow direction from a middle region distanced to the valve seat, to an end region. In this manner, it is ensured that the shut-off body also in the opened position of the non-return valve is located in a defined position set by the guide, so that flow cross section which is the same size to all sides results, by which means on the one hand eddies are largely avoided and on the other hand the same predefined position is always achieved for the check function which is to say non-return function.

Advantageously, the inner contour of the guide in its end region is designed running radially inwards and in a returning manner with respect to the main flow direction. This returning region serves for giving the shut-off body a defined contact surface in the opened position of the valve.

Amazingly, it has been found that it is particularly advantageous if the inner contour of the guide, in the middle region, thus between the inwardly tapered regions is designed in a part-circle-shaped manner. This part-circle-shaped region gives the shut-off body a greater scope for play than in the end positions, in particular in the radial direction.

Advantageously, the guide is designed with a multitude of recesses or free spaces, which permit a low-loss flow in this region. This advantageously can be achieved by way of the guide according to a further development of the invention only being formed by guide arms which arranged in a distributed manner over the periphery of the shut-off body and which are fastened on a common holding ring. Such a guide can be formed for example by way of four to ten such guide arms which let through the flow between the valve seat and the shut-off body in a practically loss-free manner in the opened position.

The guide arms and the holding ring can be designed as one piece, for example as a molded component or by way of other forming methods.

According to a further development of the invention, the guide arms and the holding ring are particularly advantageously formed from a sheet-metal section, wherein the guide arms are formed from the base material and are bent away with respect to this, preferably by 90°. Such a sheet-metal section can be formed as an inexpensive component by way of punching or laser cutting, wherein the guide arms can be manufactured in a very precise manner by way of laser cutting, and these arms after bending away, preferably by 90° from the base material, form the contour according to the invention, for guidance in the three-dimensional space. Thereby, advantageously the guide arms and the holding ring are formed from an annular sheet-metal section, wherein the guide arms are bent away about an essentially radially running line. Radially running line is to be understood as such which is arranged radially to an imagined middle axis of the annular sheet-metal section. The guide arms thus before the bending-away lie on an annulus section peripherally next to one another and are surrounded by the holding ring, and then are bent by 90° away from the annulus section.

Advantageously, the bending-away of the guide arms is effected in the direction of the swirl direction of the delivery fluid which is defined by the impeller and the diffuser of the last stage, in order to ensure that in normal delivery operation, the guide arms are loaded by the swirling of the delivery fluid in the bending direction and not counter to the bending direction.

The shut-off body is advantageously formed by a plate which is shaped from sheet-metal and which has an annular contact surface which is set obliquely to the valve seat. Such a plate shaped from sheet metal can be inexpensively manufactured, just as the holding ring and guide arms.

The shut-off body is advantageously provided with a central boss in the region surrounded by the contact surface, in order to increase the stability of the shut-off body and to reduce the construction height.

Advantageously, the valve seat is also formed by an annular component which is shaped from sheet metal and which is provided with an annular seal.

Advantageously, the non-return valve comprises a housing, into which the guide, the shut-off body and the valve seat are integrated with a positive fit and in a reversible manner. Such an arrangement is particularly advantageous since the components of the non-return valve can be disassembled, i.e. the shut-off body and the valve seat cleaned and renewed as the case may be, whereas the remaining components can continue to be used. Typically, only the sealing ring is renewed, all other components can continue to be used.

The housing of the non-return valve advantageously has an essentially cylindrical shape and is designed in a tapered manner at one axial end and is connected to the pump at the other one. Thereby, the housing can advantageously comprise a coupling for the releasable connection to the pump or itself form part of the pump housing. The housing can for example comprise recesses, into which positive-fit means for the tie rods engage, said tie rods clamping the pump stages, i.e. holding them in mechanical retention in the axial direction of the pump.

Thereby, the pump housing is advantageously essentially cylindrical and the valve housing is designed such that it connects to the pump housing or to the last pump stages in a flush or aligned manner and extends the pump housing to the top.

The invention is hereinafter explained in more detail by way of embodiment examples represented in the figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

FIG. 7 is a plan view of a sheet-metal section for forming a holding ring with guide arms;

DESCRIPTION OF THE PREFERRED EMBODIMENTS

Figure 1:
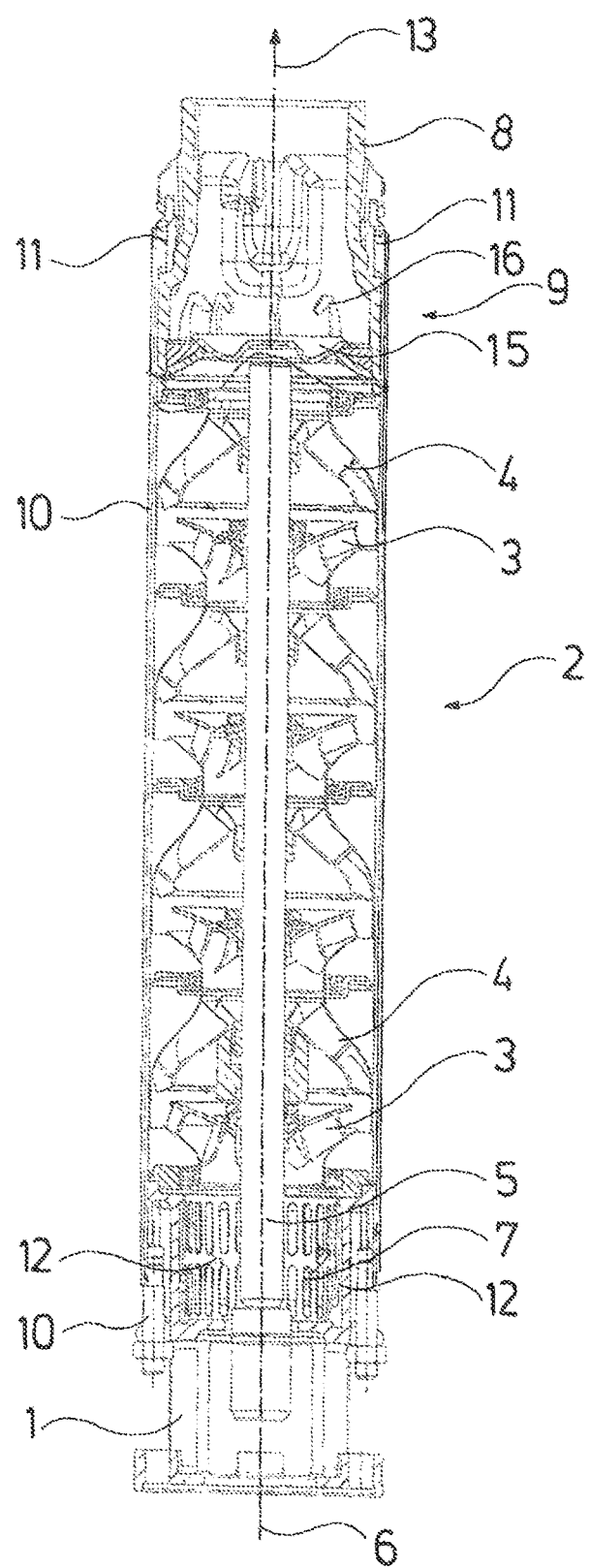
FIG. 1 is a longitudinal sectional greatly simplified representation of a multistage submersible pump with a non-return valve.

With the pump represented by way of FIG. 1, the drive motor which is necessary for operation is not shown and this in the representation according to FIG. 1 connects at the bottom to a coupling 1 which connects the drive motor and the pump 2 to one another. The pump 2 here comprises four pump stages which are hydraulically connected one after the other, in each case consisting of a pump impeller 3 and a diffuser 4 which is connected downstream of this in the flow direction. The pump impellers 3 are driven via a common shaft 5 which ends at the upper side of the uppermost diffuser 4 and at the lower side reaches to up to the coupling 1 where it is designed for the rotationally fixed connection to the free shaft end of the drive motor. The housing is formed by sheet-metal forming parts in the region of the pump impellers 3 and the diffusers 4, as is counted as belonging to the state of the art, and in this context the corresponding well pumps of the type Grundfos SP 30 are referred to. These housing parts in each case receiving a pump impeller 3 and a diffuser 4 are clamped between a lower housing part 7 forming the fluid inlet and an upper housing part 8 receiving a non-return valve 9, in the direction of the longitudinal axis 6 of the pump, and specifically via lateral tie rods 10 which on the one hand are fixed in recesses 11 in the upper housing part 8 and on the other hand in the coupling 1. The tie rods 10 in the region of the coupling 1 are designed as threaded bolts and pass through bores in the coupling 1 and are tightened with nuts there.

In operation, the pump impellers 3 are driven by the common shaft 5 and the delivery fluid via recesses 12 in the lower housing part 7 gets into the inside of the pump, from there via the pump stages, in which a pressure increase is effected in each case, up to the diffuser 4 of the uppermost pump stage, where the delivery fluid penetrates the non-return valve 9, so as to exit at the upper end of the upper housing part 8. The main delivery flow thus extends in the direction 13 through the pump, i.e. in the direction of the longitudinal axis 6 from the lower housing part 7 to the upper housing part 8. The delivery fluid flows through the non-return valve 9 not only in the direction 13, but there also has a swirling.

The upper housing part 8 which at the same time forms the housing of the non-return valve 9 is seated with a positive fit, amid the integration of a seal, on the diffuser 4 of the last pump stage and otherwise in the direction of the longitudinal axis 6 is connected to the other lower housing part 7 and the coupling 1 via tie rods 10.

Figure 2:
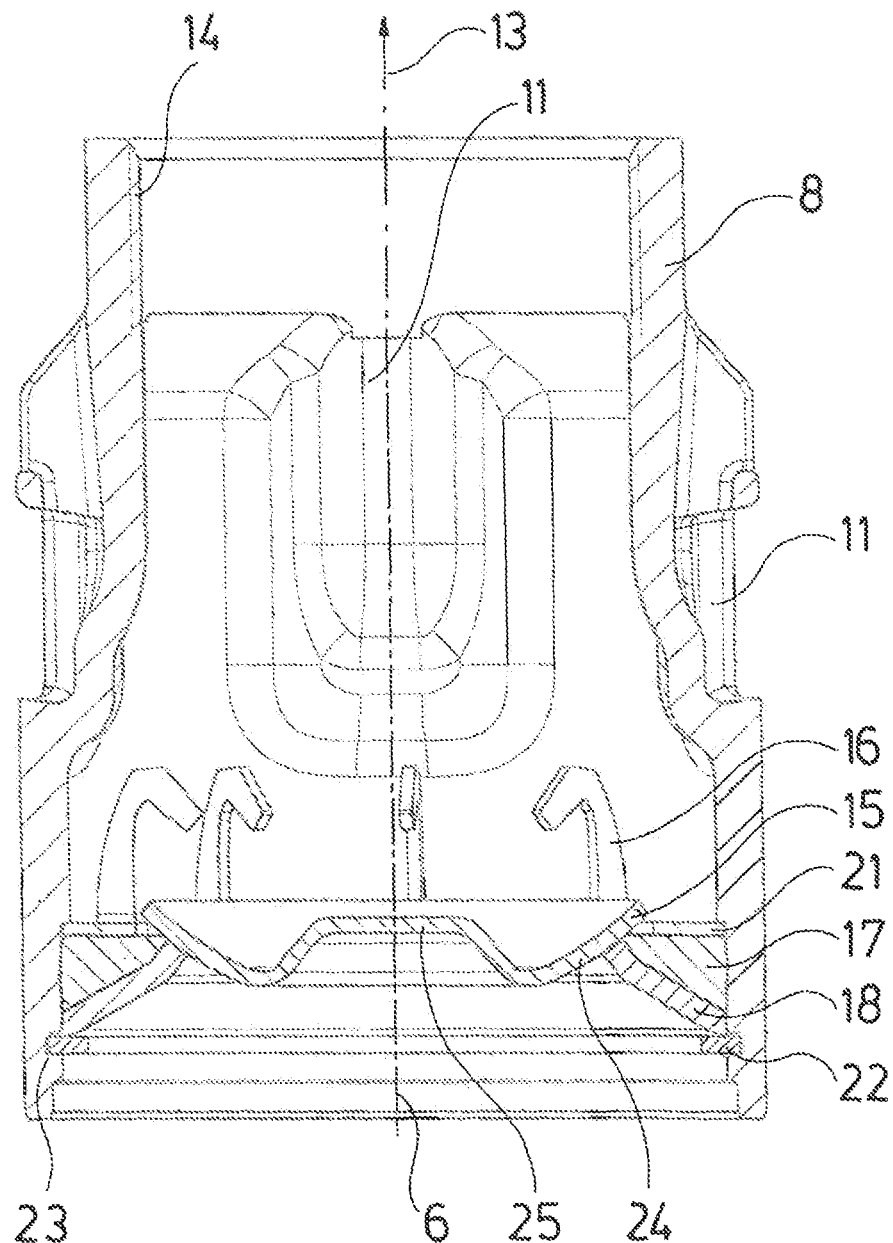
FIG. 2 is an enlarged longitudinal sectional representation of the non-return valve of the pump according to FIG. 1, in a closure position.
Figure 3:
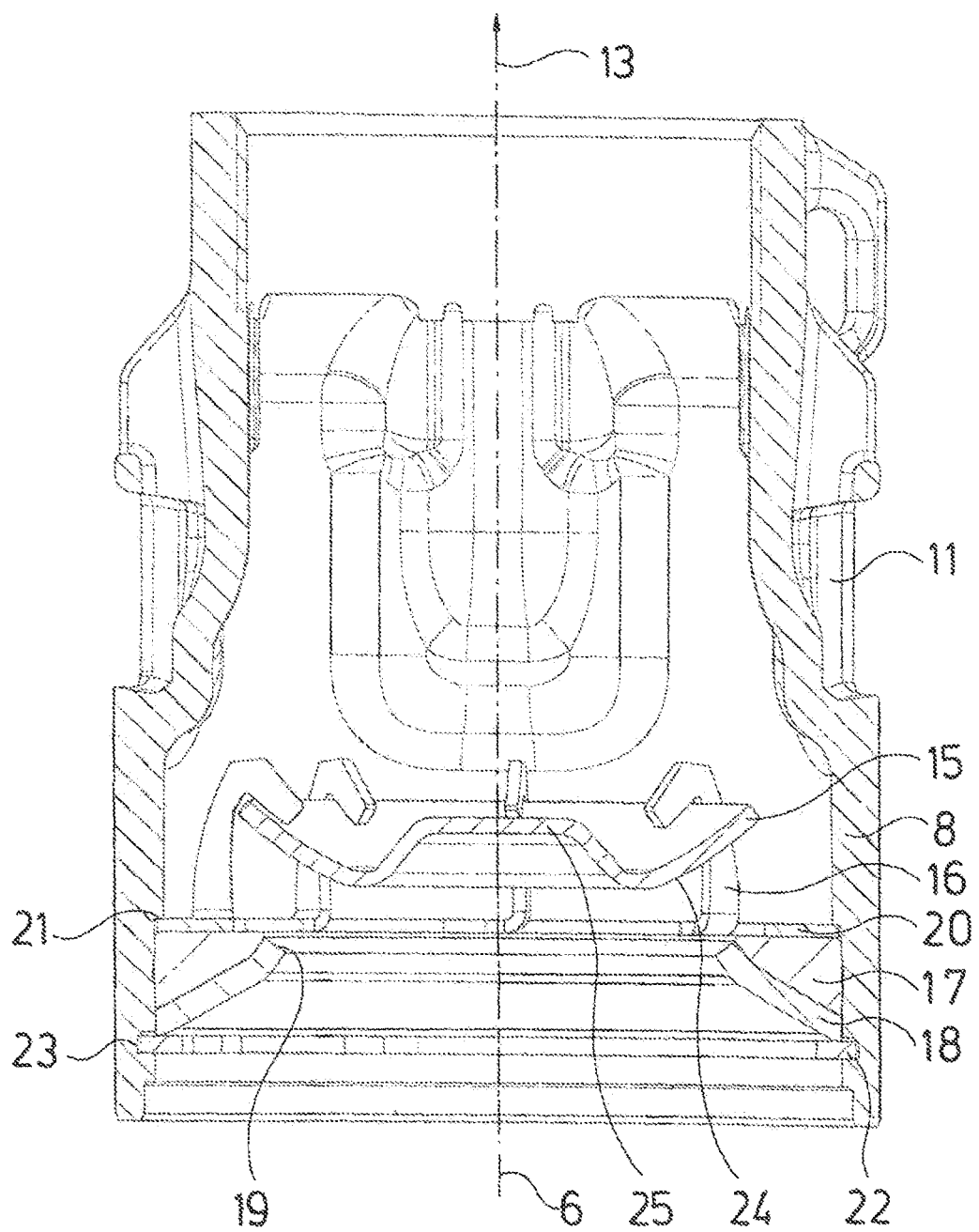
FIG. 3 is a representation according to FIG. 2 of the valve in the opened position.
Figure 4:
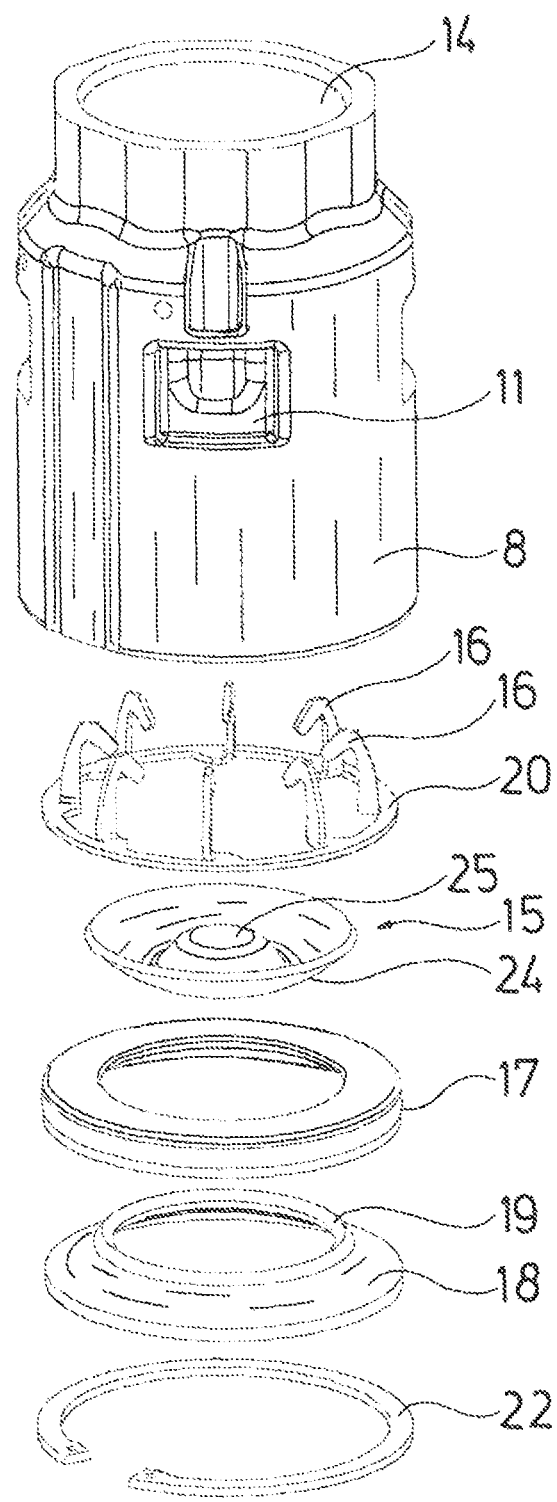
FIG. 4 is an exploded representation of the non-return valve according to FIG. 2.
Figure 5:
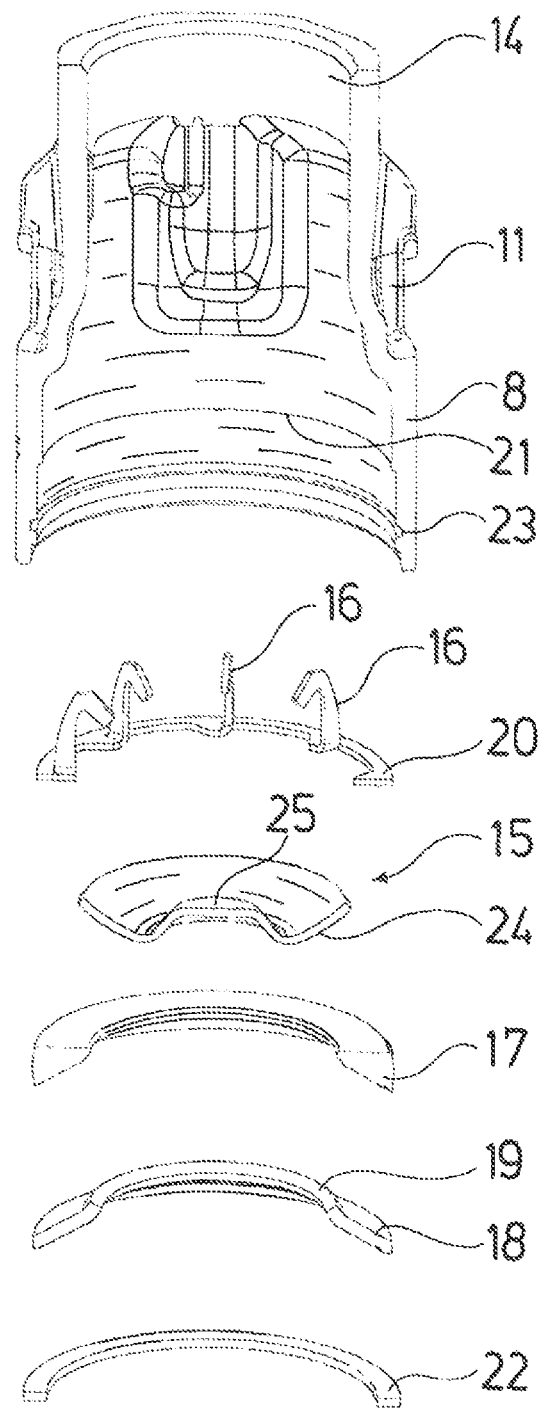
FIG. 5 is a longitudinal sectional representation according to FIG. 4 of the valve according to FIG. 4.

The non-return valve 9 in FIG. 2 is represented in a closed, and in FIG. 3 in an opened position. It has an essentially cylindrical housing 8 which towards the pump stages merges into the cylindrical outer periphery of the pump in a flush manner. It is designed in a tapering manner towards the upper end of the pump, and there has an inner thread 14 for the connection of a delivery conduit. The non-return valve 9 apart from the surrounding valve housing 8 comprises a plate-like shut-off body 15 and a guide which surrounds this, is formed by guide arms 16 and receives the shut-off body 15 in a limitedly movable manner, but otherwise with a positive fit to the top, i.e. in the main flow direction 13 and outwards, i.e. in the radial direction. The shut-off body 15, as is represented in FIG. 2, is provided for the sealing bearing contact on an annular seal 17 which for its part is supported by a ring 18 which is shaped from sheet metal and which has a contact surface 19 which together with the seal forms the valve seat of the non-return valve 9. The contact surface 19, is particularly clearly visible from FIGS. 4 and 5, is set obliquely and is covered by the seal 17. In the closed condition of the valve 8, the shut-off body 15 with its peripheral oblique surface pointing downwards in the figures, presses onto the inner periphery of the seal 17 which for its part is supported by the contact surface 19 of the ring 18, so that a sealed valve closure is given.

The guide arms 16 are fastened on a holding ring 20, which is inserted from below into the valve housing 8 and comes to bear on a peripheral, step-like shoulder 21 of the housing 8. Subsequently, the seal 17 as well as the ring 18 is inserted from below into the valve housing 8 and concluding, is secured with a positive fit by a clamping ring 22 which is fastened in a peripheral groove 23 on the inner side of the valve housing 8. The non-return valve 9 can thus be disassembled after removing the upper housing part 8 from the pump 2 as well as removing the clamping ring 22, and can be overhauled and assembled together again, and no special tools are necessary for this.

The supporting components of the valve, specifically the holding ring 20 with the guide arms 16, the ring 18 as well as the shut-off body 15, with the embodiment variant which is represented by way of FIGS. 2-6 are designed of sheet-metal. The shut-off body 15 is formed from a circular disk and comprises an oblique surface 24 which is envisaged for bearing on the seal 17, as well as a central boss 25 which serves for the stiffening of the component. The shut-off body 15 is circularly round and is guided by guide arms 16 between its closure position (FIG. 2) which bears with the oblique surface 24 on the seal 17, and the opened position, in which the shut-off body 15 bears on the free ends of the guide arms 16.

Figure 6:
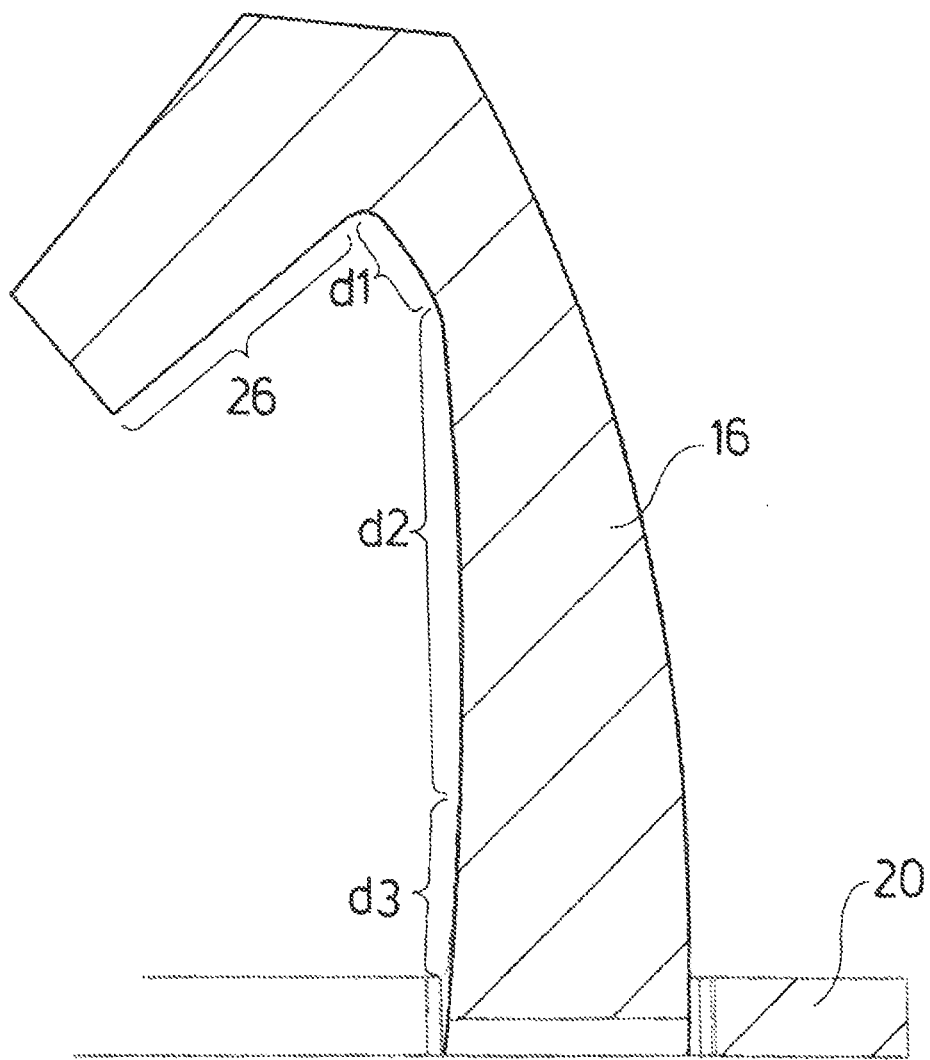
FIG. 6 is a greatly enlarged longitudinal sectional representation of a guide arm.

In order to ensure that the shut-off body 15 always gets into its correctly envisaged closure position independently of the position of the pump, the guide arms 16, as is particularly evident from the representation according to FIG. 6, are designed tapering inwards, counter to the main flow direction 13, towards the valve seat, thus towards the contact surface 19. In this region which is characterized in FIG. 6 at d3, the lateral play between the guide arms 16 and the shut-off body 15 becomes smaller, the further the shut-off body 15 is moved towards the contact surface 19. In this manner, even with a horizontally operated pump 2, one can ensure that the shut-off body 15 on moving into its closure position is guided into the correct, centered position to the contact surface 19.

A middle region d2 connects next to the inwardly tapering region d3, in which middle region the guide arms 16 surround the shut-off body 15 with significant play and to which in turn a region d1 connects, said region d1 being designed tapering inwards but in the counter direction to the region d3. In the region d1, the inner contour of the guide, thus the inner side of the guide arms 16, tapers inwards in the main flow direction 13. Finally, the guide comprises a returning region 26 which likewise tapers inwardly but oppositely to the main flow direction 13, by which means this hook-like inner contour of the guide arms 16 results, which is clearly visible in FIG. 6, and this returning region 26 supports the shut-off body 15 in its opened position (see FIG. 3).

In the represented embodiment example, regions d1, d2, and d3 are contoured in a part-circle-shaped manner, wherein the diameter of the part-circle d2 is larger than that of the part-circle d3 and which in turn is larger than that of the part-circle d1. The diameter of the part-circle d1 is larger than the diameter of the shut-off body 15 which in turn is greater than the diameter of the central recess in the ring 18.

The guide which is formed by the guide arms 16 is manufactured from an annular sheet-metal section as is represented in FIG. 7. This sheet-metal section has a continuously peripheral outer ring which forms the later holding ring 20. An inner-lying ring is divided by incisions 27 which are effected by way of a laser beam, here in total into eight segments which in each case form a guide arm 16. The inner contour of the guide arms 16 is thus formed by the inner contour of this ring. These segment-like sections which are formed by the incisions 27 are bent away upwards out of the sheet-metal section by 90° about a line 28 running essentially radially to the ring, in order to form the guide for the shut-off body 15. This bending-away of the guide arms 16 upwards by 90° out of the base material formed by the ring is effected in a direction which corresponds to the swirl direction of the delivery fluid which is to be expected at the end of the last pump stage inherently of the design, so that the flowing delivery fluid loads the guide arms 16 in the bending direction and not in the opposite direction.

Figure 9:
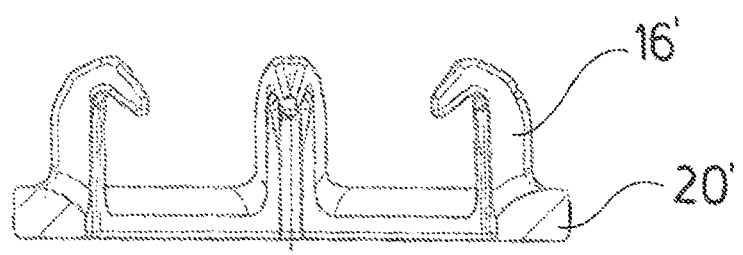
FIG. 9 is a longitudinal sectional view taken along the section line IX-IX in FIG. 8.
Figure 8:
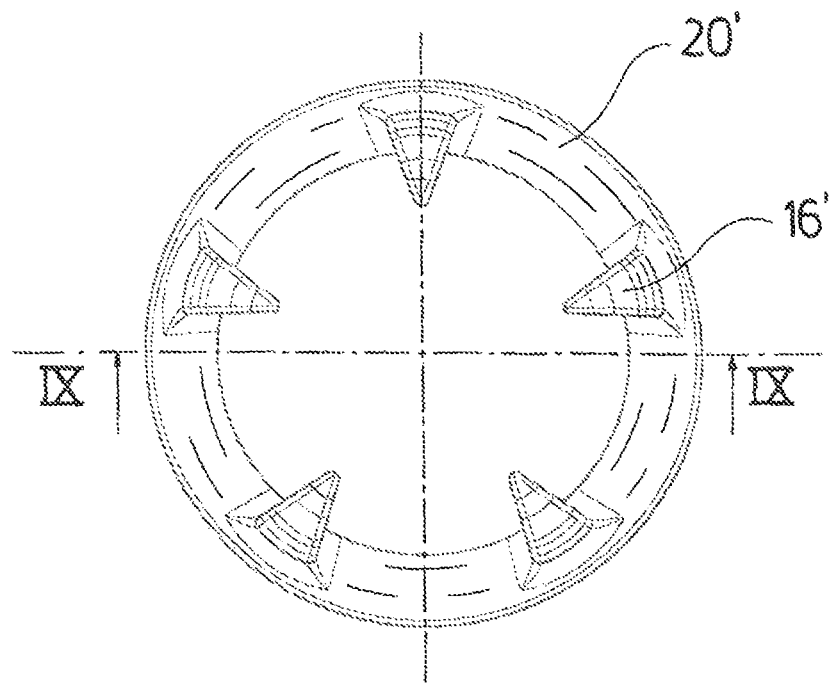
FIG. 8 is a plan view of another embodiment of a holding ring with guide arms.

An alternative embodiment of the guide is represented by way of FIGS. 8 and 9. There, in total 5 guide arms 16' are provided, which are designed as one piece with a holding ring 20'. Even if this is not evident in FIG. 9, thus the inner contour of the guide arms 16' is designed in the same manner as the guide arms 16' represented by way of FIG. 6. The component is manufactured as a molded part.

While specific embodiments of the invention have been shown and described in detail to illustrate the application of the principles of the invention, it will be understood that the invention may be embodied otherwise without departing from such principles.

APPENDIX

List of Reference Numerals

1—coupling
2—pump
3—pump impeller
4—diffuser
5—shaft
6—longitudinal axis of the pump
7—lower housing part
8—upper housing part, valve housing
9—non-return valve
10—tie rods
11—recesses in 8
12—recesses in 7
13—main flow direction
14—inner thread
15—shut-off body
16—guide arms
16'—guide arms in the FIGS. 8 and 9
17—seal
18—ring
19—contact surface
20—holding ring
20'—holding ring in FIGS. 8 and 9
21—shoulder in 8
22—clamping ring
23—groove in 8
24—oblique surface of 15
25—boss
26—returning part
27—incisions
28—lines
d1-d3—regions of the inner contour

What is claimed is:

1. A centrifugal multi-stage submersible pump comprising a non-return valve comprising:
    a valve seat;
    a guide; and
    a shut-off body arranged movably, in a limited manner relative to the valve seat and with a positive fit, within the guide between an open position and a closed position, the guide surrounding the shut-off body with radial play, the guide having an inner contour tapering inwards towards the valve seat counter to a main flow direction, so that the radial play of the guide increases directly when lifting the shut-off body from the valve seat.

2. The centrifugal pump according to claim 1, wherein the inner contour of the guide in the main flow direction also tapers inwards from a middle region, at a distance from the valve seat, towards an end region adjacent to the valve seat.

3. The centrifugal pump according to claim 2, wherein the inner contour of the guide in the end region runs radially inwards and in a returning manner with respect to the main flow direction.

4. The centrifugal pump according to claim 1, wherein the inner contour of the guide runs in a part-circle-shaped manner in a middle region.

5. The centrifugal pump according to claim 1, wherein the guide comprises:
    a common holding ring; and
    guide arms arranged distributed over a periphery of the shut-off body, the guide arms being fastened on the common holding ring.

6. The centrifugal pump according to claim 5, wherein the guide arms and the holding ring are formed as a single-piece molded component.

7. The centrifugal pump according to claim 5, wherein the guide arms and the holding ring are formed from a sheet metal section, wherein the guide arms are formed by way of bending out of the base material and are bent away by about 90° with respect to the remaining base material.

8. The centrifugal pump according to claim 7, further comprising:
    an impeller; and
    a diffuser, wherein:
    the impeller and the diffuser are part of a last pump stage; and
    the guide arms are bent away in the direction of a swirl direction of a delivery fluid which is defined by the impeller and the diffuser of the last pump strange.

9. The centrifugal pump according to claim 5, wherein the guide arms and the holding ring are formed from an annular sheet-metal section, and the guide arms are bent away about an essentially radially running line.

10. The centrifugal pump according to claim 1, wherein the guide comprises a plurality of guide arms, wherein the shut-off body is formed by a plate which is shaped from sheet-metal and which comprises a planar portion and an obliquely set, annular contact surface directed towards the valve seat.

11. The centrifugal pump according to claim 10, wherein the planar portion comprises a central boss.

12. The centrifugal pump according to claim 11, further comprising a pump housing that is essentially cylindrical, wherein the valve housing connects to the pump housing in a flush manner and extends upwardly from the valve housing.

13. The centrifugal pump according to claim 10, wherein:
    the valve housing has an essentially cylindrical shape;
    the valve housing is tapered at one end; and
    at another end the housing is provided with a coupling for a releasable connection to the pump.

14. The centrifugal pump according to claim 1, wherein the guide comprises a plurality of guide arms, wherein the valve seat is formed by an annular component shaped from sheet-metal, as well as by an annular seal, the shut-off body comprising two contact surfaces, one of the two contact surfaces being located opposite another one of the two contact surfaces, the one of the two contact surfaces being in contact with the annular component when the shut-off body is in the closed position, the another one of the two contact surfaces engaging a portion of at least one of the guide arms when the shut-off body is in the open position.

15. The centrifugal pump according to claim 1, wherein the non-return valve further comprises a valve housing into which the guide, the shut-off body and the valve seat are releasably integrated with a positive fit.

16. A centrifugal multi-stage submersible pump comprising a non-return valve comprising:
    a valve seat comprising a longitudinal axis;

a guide comprising a catch returning section, the catch returning section defining one end of the guide, wherein the guide comprises a guide portion extending from another end of the guide to a position located adjacent to the catch returning section; and a shut-off body arranged movably, in a limited manner relative to the valve seat and with a positive fit, within the guide, the guide surrounding the shut-off body with radial play, the catch returning section extending radially inward from the guide portion in a direction of the shut-off body, the shut-off body comprising a closed position and an open position, the guide portion comprising a radially inward taper in a direction of the longitudinal axis such that the radial play of the guide increases directly when lifting the shut-off body from the valve seat.

17. The centrifugal pump according to claim 16, wherein the guide portion comprises a first guide portion region, a second guide portion region and a third guide portion region, at least a portion of the first guide portion region being located at the another end of the guide, at least a portion of the third guide portion region being located adjacent to the catch returning section, the second guide portion region being arranged between the first guide portion region and the third guide portion region, the first guide portion region comprising a first guide portion region dimension, the second guide portion region comprising a second guide portion region dimension, the third guide portion region comprising a third guide portion region dimension, the second guide portion region dimension being greater than the first guide portion region dimension, the third guide portion region dimension being less than second guide portion region dimension, the catch returning section comprising an inner surface, the inner surface being bent relative to the guide portion, wherein the inner surface faces in a direction of at least the second guide portion.

18. The centrifugal pump according to claim 16, wherein the guide comprises a plurality of guide arms, wherein the radially inward taper extends continuously from the another end of the guide of the guide to the position located adjacent to the catch returning section, the catch returning section extending in a direction counter to a main flow direction of the centrifugal pump, wherein a diameter of the shut-off body is less than a diameter defined by each of the guide arms, the shut-off body comprising two contact surfaces, one of the two contact surfaces being located opposite another one of the two contact surfaces, the valve seat comprising an annular component, the one of the two contact surfaces being in contact with the annular component when the shut-off body is in the closed position, the another one of the two contact surfaces engaging a portion of at least one of the guide arms when the shut-off body is in the open position.

19. A centrifugal multi-stage submersible pump comprising a non-return valve comprising:

a valve seat comprising a longitudinal axis;

a guide comprising a catch returning section, the catch returning section defining one end of the guide, wherein the guide comprises a guide portion, the guide portion extending from another end of the guide to a position located adjacent to the catch returning section, the guide portion comprising guide portion contour, the guide portion contour comprising a radially inward taper in a direction of the longitudinal axis; and a shut-off body arranged movably, in a limited manner relative to the valve seat and with a positive fit, within the guide such that the shut-off body is movable from at least a closed position to at least an open position, the guide surrounding the shut-off body with radial play, the catch returning section extending radially inward from the guide portion in a direction of the shut-off body, wherein a radial space is defined between the shut-off body the guide when the shut-off body is the open position and when the shut-off body is in the closed position.

20. The centrifugal pump according to claim 19, wherein the guide portion comprises a first guide portion region, a second guide portion region and a third guide portion region, at least a portion of the first guide portion region being located at the another end of the guide, at least a portion of the third guide portion region being located adjacent to the catch returning section, the second guide portion region being arranged between the first guide portion region and the third guide portion region, the first guide portion region comprising a first guide portion region dimension, the second guide portion region comprising a second guide portion region dimension, the third guide portion region comprising a third guide portion region dimension, the second guide portion region dimension being greater than the first guide portion region dimension, the third guide portion region dimension being less than second guide portion region dimension, the catch returning section comprising an inner surface, the inner surface being bent relative to the guide portion, wherein the inner surface faces in a direction of at least the second guide portion, the shut-off body comprising a plate, the plate comprising a planar portion and an annular portion bent relative to the planar portion, the annular portion extending about the planar portion.

* * * * *